(12) United States Patent
Stalder et al.

(10) Patent No.: US 8,102,674 B2
(45) Date of Patent: Jan. 24, 2012

(54) TRANSPONDER AND TOOL FOR READING AND/OR WRITING DATA IN SAID TRANSPONDER

(75) Inventors: Philippe Stalder, La Chaux-de-Fonds (CH); Daniel Boillod, legal representative, Cernier (CH); Alain Maillard, La Chaux-de-Fonds (CH)

(73) Assignee: Elecsys International Corporation, Olathe, KS (US)

( * ) Notice: Subject to any disclaimer, the term of this patent is extended or adjusted under 35 U.S.C. 154(b) by 1054 days.

(21) Appl. No.: 10/531,599

(22) PCT Filed: Oct. 18, 2002

(86) PCT No.: PCT/CH02/00570
§ 371 (c)(1),
(2), (4) Date: Nov. 9, 2005

(87) PCT Pub. No.: WO2004/036495
PCT Pub. Date: Apr. 29, 2004

(65) Prior Publication Data
US 2006/0152910 A1     Jul. 13, 2006

(51) Int. Cl.
*H05K 7/02* (2006.01)
*H05K 7/04* (2006.01)

(52) U.S. Cl. ............... 361/810; 361/738; 361/807
(58) Field of Classification Search .......... 361/736–737; 343/740–745
See application file for complete search history.

(56) References Cited

U.S. PATENT DOCUMENTS 6,304,232 B1 * 10/2001 Brown et al. ............... 343/895
6,839,035 B1 *  1/2005 Addonisio et al. ......... 343/742

FOREIGN PATENT DOCUMENTS

| EP | 1 065 791 | 1/2001 |
| WO | WO 99 35857 | 7/1999 |
| WO | WO 00 28339 | 5/2000 |

\* cited by examiner

*Primary Examiner* — Tuan T Dinh
(74) *Attorney, Agent, or Firm* — Hovey Williams LLP

(57) ABSTRACT

A transponder includes an integrated circuit (1) and an antenna (5) which is electrically connected to the integrated circuit (1) in a removable manner, the removable electrical connection including at least one intermediate connection element (4). The removable connection, together with the intermediate connection element (4) between the antenna (5) and the integrated circuit (1), can be used to divide the transponder into two parts. Moreover, the intermediate connection element (4) can also be used, in one variant, to reinforce mechanically at least one part of the contact elements (40), while facilitating the precise fixing of the contact elements to the corresponding element of the object to be marked.

9 Claims, 3 Drawing Sheets

TRANSPONDER AND TOOL FOR READING AND/OR WRITING DATA IN SAID TRANSPONDER

CROSS-REFERENCE TO RELATED APPLICATIONS

The present application claims benefit of priority and incorporates by reference PCT/CH2002/000570 filed Oct. 18, 2002.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION

1. Field of the Invention

This invention relates to a transponder as well as a reading and/or writing tool that can be used, for example, for testing and/or programming of the transponder.

2. Description of Related Art

Transponders are generally passive electronic circuits that comprise essentially an integrated circuit in which data can be stored, and an antenna that is electrically connected to the integrated circuit and that allows remote reading and/or recording of these data using a suitable reader. Transponders are used in the most varied applications, most often to identify, using the data they contain, an object to which they are attached or into which they have been inserted. The object is thus labeled by the transponder. Transponders are very often quite small in order to be inconspicuous or in order to be able to be inserted into objects in which available space is limited, such as, for example, into watch cases.

The transponder antenna generally consists of an induction coil made of a very fine copper wire. In the transponders of the prior art, the two ends of the coil are generally fixed, for example soldered, either on a small printed circuit on which the integrated circuit is likewise soldered, as described, for example, in International Application WO 96/07982, or directly on the integrated circuit. Such transponders are very delicate, mainly due to the risks of deformation of the coil and/or risks of breakage of the electrical circuit, especially near the solder, as a result of twisting of the copper wire. The position of the antenna relative to the integrated circuit thus must be as stable as possible. The antenna and the integrated circuit are very often kept together, for example in an electrically nonconductive resin, inside a box that protects the transponder against external stresses and prevents twisting, and thus breakage of the coil wires.

Transponders thus generally appear in the form of small electronic circuits, often rigid, with a size determined mainly by the external dimensions of the antenna that must exceed certain values in order to guarantee it sufficient gain.

In certain applications, however, it is difficult to discretely integrate such a transponder, precisely because of the size of the antenna. Thus, in the case of a watch, for example, the transponder is very often placed under the glass, on the periphery of the face, because this is essentially the only location allowing an antenna to be accommodated. Such an approach, however, cannot always be used, mainly for aesthetic reasons. Another approach is then to attach the transponder on the back of the watch, in which it can be easily concealed. The disadvantage of this variant is that since the back can very often be easily removed from the case of the watch, it becomes easy to destroy or tamper with the identification data of the watch that are contained in the integrated circuit by removing the transponder from the watch or by replacing the back of the watch by the back of another watch, for example.

BRIEF SUMMARY OF THE INVENTION

One of the objects of this invention is thus to propose a transponder with an antenna that can be placed on any suitable portion of the object to be labeled, regardless of the chosen site for the integrated circuit that can contain sometimes sensitive data.

Within the framework of the development of this invention it has thus been suggested that a certain length be left on each wire at the end of the coil before attaching them to the integrated circuit, thus making it possible to move the antenna away from the integrated circuit to a maximum distance equivalent to the length of these wires. The antenna and the integrated circuit can then be treated as two separate portions of the same transponder, interconnected by two wires ensuring their electrical connection. These two portions of the transponder can then be placed in different locations on the object to be labeled, the distance between these locations being limited, however, by the length of the wires. For example, it has been suggested that, in the case of a watch, the integrated circuit be connected to the middle of the case or to the movement of the watch, in order to prevent its easy replacement or removal, whereas the coil would be fixed on the back of the watch where it can be easily concealed.

This approach, if it allows independent selection of the location of each of the two portions of the transponder, likewise has major limitations. In particular, it is not a good idea to install each of the two portions of such a transponder on elements of the object to be labeled that are designed to be completely detached from one another. Actually, once detached, these two elements would remain permanently connected by the fine, delicate wires of the ends of the coil that risk being exposed to mechanical stresses that can cause them to break, thus damaging the transponder. If, in order to reduce this risk, the length of the wires between the two portions of the transponder is increased, thus allowing, for example, the implementation of certain manipulations on one of the two elements detached from the object without exposure to overly strong stresses to the wires connecting it to the second detached element, the problem that arises is then that of proper housing of the wires when the object is being reassembled. Moreover, in the case of a watch, for example, since the back is permanently connected to the middle of the case by the antenna wires, it could not be easily changed.

Another object of the invention is thus to suggest a transponder, of which one portion can be fixed to one element of the object to be labeled, capable of being completely detached from another element of the object to be labeled, on which another portion of the transponder is fixed, without the above-described disadvantages arising.

Another object of this invention is to propose a transponder, of which the assembly and exact positioning on the object to be labeled are facilitated.

These objects are achieved by a transponder with the characteristics of claim 1, advantageous variants being described by the dependent claims.

In particular, this object is achieved by a transponder comprising an integrated circuit and an antenna interconnected in a detachable manner and comprising at least one intermediate connecting element that ensures a detachable connection of the antenna to the integrated circuit. The detachable connection of the antenna to the integrated circuit thus makes it possible to completely separate the transponder into two portions, the intermediate connecting element, moreover, in one variant of the invention allowing mechanical reinforcement of at least one portion of the elements of this connection, while facilitating their exact attachment at the instant of assembly of the transponder.

DE 19910768 describes a chip card comprising an integrated circuit and an antenna integrated into the card. The integrated circuit is likewise connected detachably to the antenna, the object being to allow replacement of the integrated circuit of the card. Electrical contact between the circuit and antenna is accomplished, however, by pressing the integrated circuit directly against the ends of the coil acting as the antenna, which is integrated into the card. This structure, if it allows detachable connection of an integrated circuit to its antenna within a single structure, cannot be used for a transponder with an antenna attached to an element of a mechanical object that must be able to be detached easily and often from the element to which the integrated circuit of the transponder is attached, even more so when the assembly of these two elements of the object to be labeled entails particular movements, for example screwing-on. Actually, the thinness and delicacy of the portions in contact, especially of the ends of the coil, would make the transponder fragile and would not guarantee its service life in such objects. Moreover, the exact positioning of the ends of the coil on the one hand and the integrated circuit on the other hand on the different elements of the object to be labeled, in order that they be perfectly aligned when the object is assembled, is a task that may prove difficult and costly, or even impossible to carry out according to the configuration of the elements to be assembled.

DETAILED DESCRIPTION OF THE INVENTION

This invention will be better understood using the description of its preferred version given here by way of example and illustrated in FIGS. 1 to 4, where:

Figure 1:
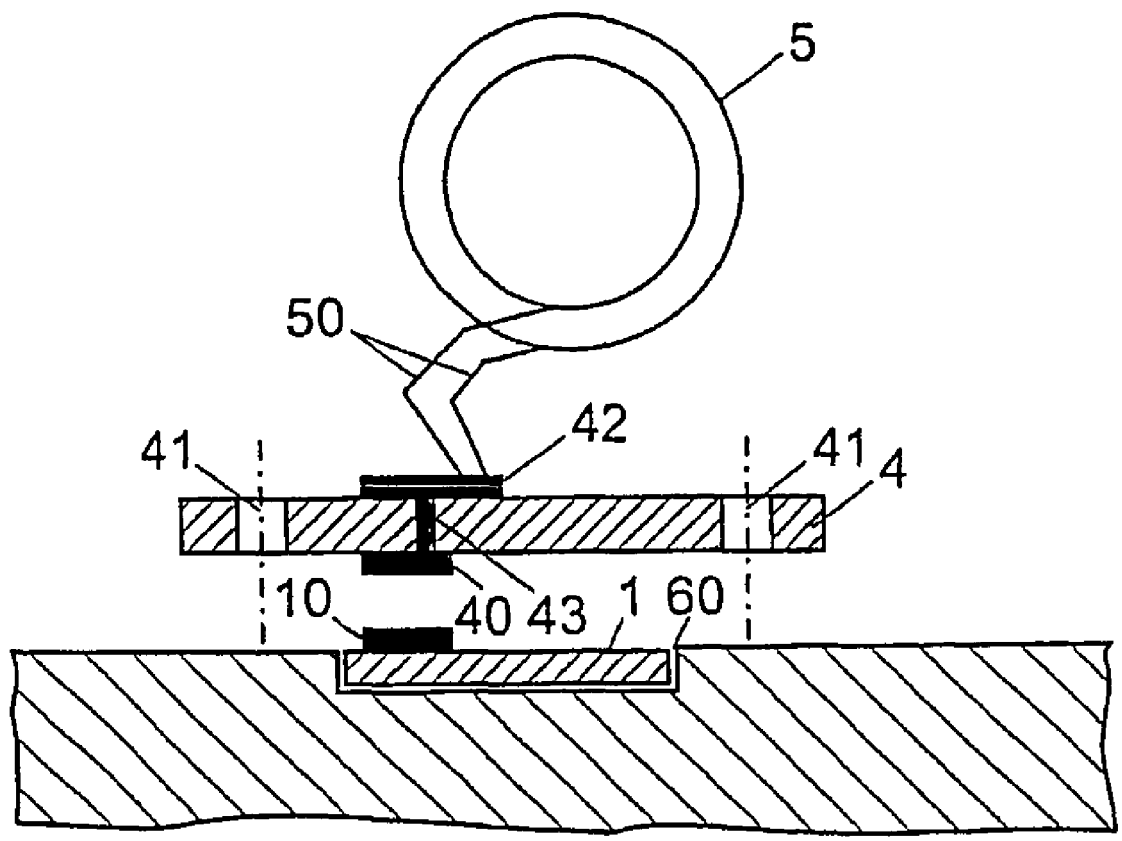
FIG. 1 shows a transponder according to the invention.
Figure 2:
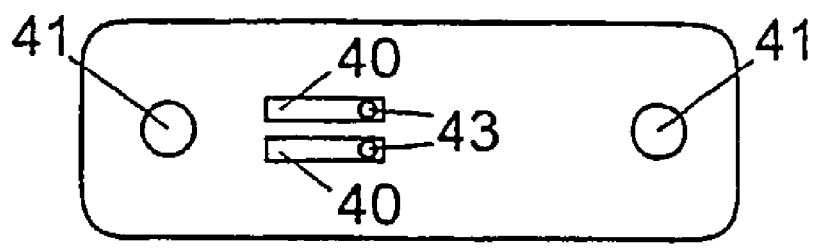
FIG. 2 shows a bottom view of the intermediate connecting element.
Figure 3:
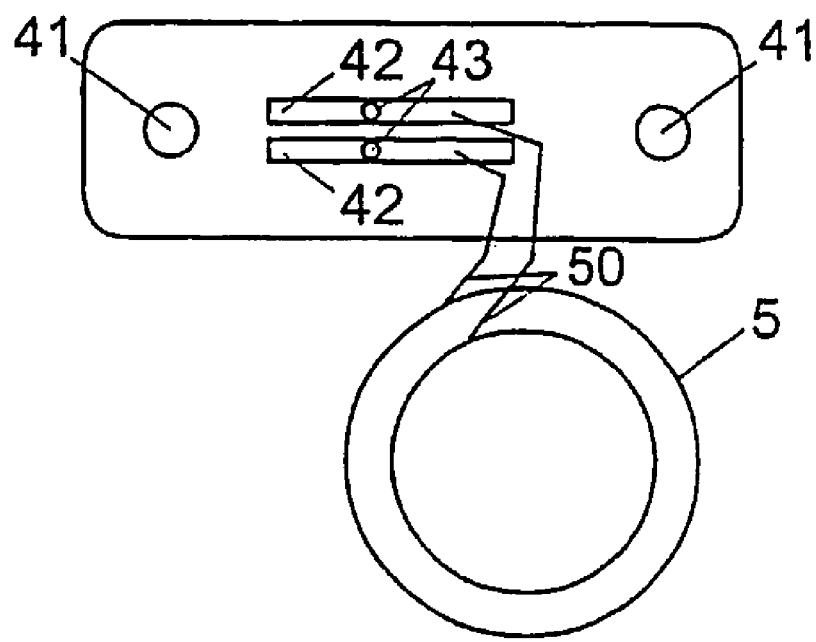
FIG. 3 shows a top view of the intermediate connecting element attached to the antenna.

The transponder according to a preferred version of the invention comprises an integrated circuit 1 comprising in this example on one of its surfaces two contact zones 10 that are designed to be connected to the antenna 5. Each contact zone 10, for example, is formed by a thin layer of a conductive material deposited on a delineated portion of the surface of the integrated circuit. The contact zones 10 are connected within the integrated circuit to points of the circuit that are not shown and that are designed to receive and transmit the signals of the antenna 5 according to one of the methods commonly used for connection of contact points of integrated circuits.

The antenna 5 of the transponder consists of, for example, a coil formed from a copper wire. The two ends 50 of the coil 5 are fixed, for example soldered or cemented, on an intermediate connecting element 4, preferably on the permanent contact zones 42 that are provided for this purpose. Each permanent contact zone 42 is electrically connected by a link, for example a plated hole 43, to a contact zone 40 located preferably on the other surface of the intermediate connecting element 4. The contact zones 40 of the intermediate connecting element 4 are arranged such that they are able to be connected to the contact zones 10 of the integrated circuit 1.

The intermediate connecting element 4 in this example is a printed circuit 4. The contact zones 40 are then formed by conductive tracks on one of the surfaces of the printed circuit 4, while the permanent contact zones 42 are the conductive tracks on the opposite surface. They are electrically interconnected in the above-described manner by paths 43 made through the printed circuit.

The integrated circuit 1 is, for example, inserted and kept in a housing 60 made on the surface of a first element 6 of the object to be labeled, while the antenna 5 is attached to a second element of the same object that is not shown and that is designed to be installed on the first element 6. The printed circuit 4 is permanently connected to the antenna 5 by the ends 50 of the coil as was explained above. The second element of the object to be labeled, which element is not shown, on which the antenna 5 is fixed, is accordingly likewise permanently connected to the intermediate connecting element 4. Since the latter is not connected permanently to the remainder of the transponder, however, the second element that is not shown can be completely detached from the first element 6 without damaging the transponder.

The printed circuit 4 preferably comprises fastening elements 41 that allow it to be easily attached in an exactly defined position, for example directly above the integrated circuit 1 on the first element 6 of the object to be labeled. In this example, the fastening elements are mounting holes 41, the location of which corresponds to that of the threads that are not shown on the first element 6 and of which the position relative to the contact zones 40 is predetermined with precision in order to ensure proper alignment of the latter with the contact zones 10 of the integrated circuit 1 when the printed circuit 4 is attached to the first element 6.

It will be apparent to one skilled in the art that other fastening elements 41 of the intermediate connecting element 4 are possible. Thus, the printed circuit 4, for example, can be kept on the first element 6 of the object to be labeled by clips located on the surface of the latter. The printed circuit 4 can likewise itself comprise clips interacting with notches on the second element 6, etc.

In the same way, the intermediate connecting element 4 can be very different from the printed circuit cited above by way of example. In particular, it can be a matter of all the support comprising contact zones 40 that on the one hand can come into contact with the contact zones 10 of the integrated circuit 1 and that on the other hand can be electrically connected permanently or detachably to the ends 50 of the antenna 5. It can be, for example, a connector consisting of a piece of insulating material in which at least two metallic pieces are kept that on one side have a flat contact zone and that on the other side have the means for attaching, for example clipping, screwing or soldering, a conductive wire. Whatever type of intermediate connecting element 4 used, the latter will preferably comprise suitable fastening elements that allow exact positioning of its contact zones 40 on the contact zones 10 of the integrated circuit 1.

During assembly of the labeled object, the connecting element 4 is then fixed on the first element 6 in the above-explained manner. The second element that is not shown can then be mounted on the first element 6 according to ordinary assembly procedures of the object. In the assembled object, each contact zone 10 of the integrated circuit 1 is in electrical contact with one of the ends 50 of the antenna 5 via one contact zone 40 of the intermediate connecting element 4, one link 43 and one permanent contact zone 42. The transponder according to the invention is then operative and data can be read and/or written in its integrated circuit 1.

The transponder according to the invention is thus comprised of at least two portions, one comprising the integrated circuit 1 and the other comprising the antenna 5. These two portions can be electrically interconnected across detachable contact zones shown in this example by contact zones 10 and 40, thus allowing the transponder to be fully operative. The detachable contacts, however, likewise allow the antenna 5 to be momentarily separated completely from the integrated circuit 1 without risking damage to the transponder.

In one sample application, the object to be labeled using the transponder of the invention is a watch with a case that has a detachable back that can be separated from the middle, thus facilitating access to the watch movement during repair or maintenance of the watch. The transponder is used, for example, to store the serial number of the watch, the identity of the owner, the dates of various maintenances, etc.

For purposes of protection against tampering, the integrated circuit 1 of the transponder is preferably housed in the middle of the watch case, or even directly on the movement. The antenna 5, conversely, in general comprised of a flat, circular coil, is fixed against the back of the case where it can be more easily integrated and concealed. The printed circuit 4 that acts as the intermediate connecting element on which the ends 50 of the antenna 5 are soldered is thus likewise connected to the back of the case. For reasons of space and in order to reduce the risks of damage, the ends 50 that connect the intermediate connecting element 4 to the antenna 5 are as short as possible, while long enough to allow facilitated assembly and disassembly of various elements of the watch.

If necessary, for example for repair or periodic maintenance of the movement, the back of the case can be removed according to the procedure that is customary for the type of watch under consideration. This operation can consist of, for example, completely unscrewing the back from the middle, unscrewing the screws that hold the back against the middle, etc. The back of the case that is again connected to the middle by ends 50 is moved as much as possible away from its housing on the middle in order to allow dismounting of the intermediate connecting element 4 from the middle. Once the intermediate connecting element 4 has been detached from the middle, the back of the case can be completely separated from the middle without points of attachment remaining between the two elements of the case, for example allowing optimum access to the watch movement.

When the watch is being re-assembled, the same operations are carried out in the reverse order: the intermediate connecting element 4 is first attached such that the detachable contacts are restored, then the back of the case is attached to the middle according to the assembly procedure established by the watch manufacturer. When the contacts between the integrated circuit 1 and the antenna 5 are re-established, the transponder is again operative.

These operations of separation and assembly of the two elements of the case can be repeated almost indefinitely without serious risk of damage to the transponder. The nature of the intermediate connecting element 4 no longer has any significant effect on the procedures of mounting and dismounting of the back, thus allowing such a transponder to be integrated in this way into any type of watch with a case whose back is detachable.

It goes without saying that in order to ensure good mechanical behavior of the transponder, each portion of the transponder can be integrated into a case in which resin can be optionally poured, except for the ends 50 that must preferably remain free. The contact zones 10, 40 of each portion, however, will have to be kept accessible to the surface of these cases, in order to allow operation of the transponder by their assembly.

One skilled in the art will also understand that it is possible to develop a transponder according to the invention comprising several intermediate connecting elements. A transponder could thus comprise two intermediate connecting elements, for example two printed circuits, a first intermediate connecting element with two contact zones connected to the contacts of the integrated circuit, the contact zones of the second intermediate connecting element then being connected to the ends of the coil that acts as the antenna. The transponder is thus assembled by pressing the first intermediate connecting element against the second such that their contact zones are in contact two by two.

In another example of such a configuration, it is likewise possible to implement a first intermediate connecting element in the form of a connector, for example female, attached to the first element of the object to be labeled, and with plugs that are connected to the integrated circuit 1. The second intermediate connecting element is then comprised of one or two male connectors attached to the ends of the ends 50, and able to be inserted into the aforementioned female connector.

In the aforementioned examples, the intermediate connecting element is generally a separate element of the transponder. One skilled in the art, however, will understand that this intermediate connecting element can likewise be frictionally connected, or even directly integrated, with one of the portions of the transponder. It can thus be a matter of, for example, particular connectors attached directly to the integrated circuit, or even formed in its case, and in which the antenna wires will be connected either directly or using, for example, male connectors that fit tightly around the end of the wires.

According to the applications, it is likewise possible to have several series of detachable contacts on the electrical connection between the antenna and the integrated circuit, this implementation, however, being subject to a serious risk of changing the impedance of the coil and increasing the signal losses on each pair of contacts, thus reducing the sensitivity in reading and/or writing of the transponder.

In the preferred version of the transponder according to the invention, the contact zones 40 that make it possible to place the ends 50 of the antenna 5 in contact with the contact zones 10 of the printed circuit 1 are formed by the conductive surfaces on the printed circuit 4. As mentioned above, it will be apparent to one skilled in the art that other implementations are possible for these contact zones. They can be formed by, for example, an intermediate connecting element of a different type, for example by an insulating support that fits tightly around two conductive rods, with one end soldered to one of the ends 50 of the antenna and the other end being used as a contact zone.

The contact zones 40 can likewise be attached to or integrated into the second element of the object to be labeled on which the antenna 5 is attached. At least one portion of this second element then acts as an intermediate connecting element. For example, this second element can be made of an insulating material on or in which conductive tracks are formed, with one end connected, for example soldered, to one of the ends 50 of the antenna 5, and with the other end acting as the contact zone 40. The fixed position of these contact zones 40 on the second element is determined such that when the second element is mounted on the first element of the labeled object, they are resting directly against the contact zones 10 of the integrated circuit 1 or are resting against the contact zones of another intermediate connecting element that are electrically connected to the integrated circuit 1. Thus, the detachable contacts are closed at the instant of mounting of the second element on the first element of the labeled object, without the additional prior operation of attachment of an intermediate element. This approach, however, requires that the procedures of mounting and dismounting of the first and the second elements between one another be adapted to the selected type of intermediate connecting element.

One skilled in the art will likewise recognize that the type of integrated circuit 1 or that the shape or size of the antenna 5 are irrelevant. The principle of the invention can be applied to any type of transponder comprising any shape of antenna.

Figure 4:
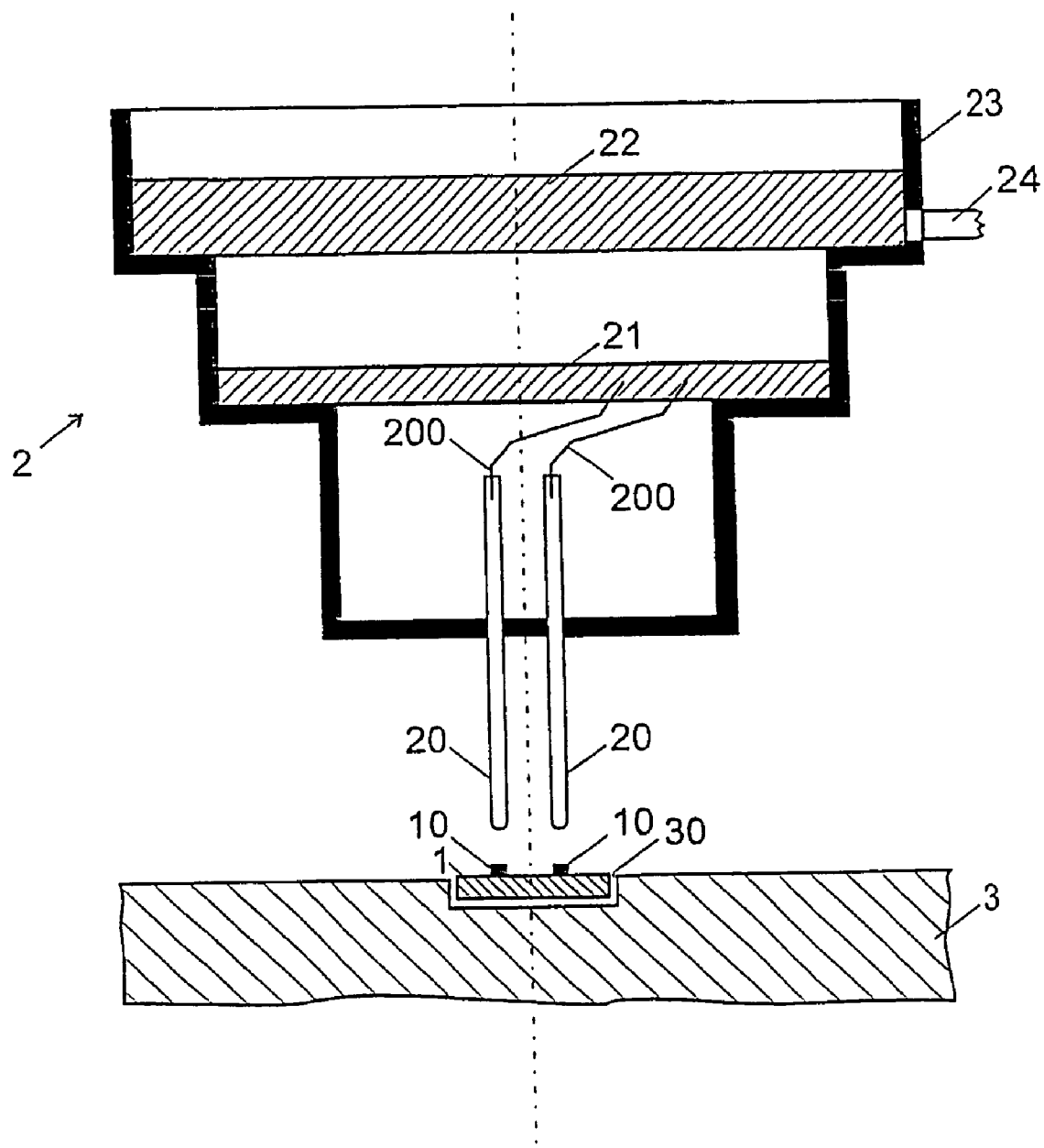
FIG. 4 illustrates a tool for reading and/or writing data in the integrated circuit of the transponder according to the invention.

One additional advantage of the transponder according to the invention is shown in FIG. 4. Due to the presence of easily accessible contacts zones 10 on the integrated circuit 1 of the transponder according to the invention, a test tool 2 can be implemented that allows reading and/or writing data in the integrated circuit 1 of the transponder under conditions very similar to those of its normal use, without its being connected to its antenna 5.

The preferred version of such a test tool 2 is illustrated in FIG. 4. The test tool 2 comprises two conductive contact lugs 20, emerging, for example, from its case 23, arranged to be able to come into contact with the contact zones 10 of the integrated circuit 1. The tool likewise comprises in the case 23 an antenna 21, preferably similar to the antenna 5 of the transponder, of which each of the ends 200 is soldered to one of the contact lugs 20. Thus, when the contact lugs 20 of the test tool 2 are in contact with the contact zones 10 of the integrated circuit 1, the latter acts with the antenna 21 in the manner of a fully operational transponder. In the case 23, the test tool 2 likewise comprises a reading antenna 22 that is kept facing the antenna 21 that is designed to be connected to the integrated circuit 1. The reading antenna 22 is connected to an external reading and/or writing apparatus that makes it possible, for example, to test the operation of the integrated circuit at the end of production, before it is integrated into the object to be labeled.

The integrated circuit 1 to be tested is preferably kept on a test bench 3 in which a housing 30 is used that guarantees it a stable and exactly determined position. The test tool 2 is preferably guided in its approach of the integrated circuit 1 by a guide that is not shown, thus ensuring alignment of the contact lugs 20 with the contact zones 10. This guide preferably consists of a horizontal axis of rotation to which the tool 2 is connected, allowing it to approach the integrated circuit to be tested in the manner of a jaw. In another variant, the guide consists of at least one vertical axis along which the tool 2 is slid.

The tool 2 described above can likewise be used for purposes other than testing of an integrated circuit 1. It can be used, for example, to program or read the data contained in the integrated circuit 1 when the second element of the object labeled by the transponder to which the antenna is attached has been removed from the object.

In the aforementioned sample application, such a tool 2 can be used, for example, during servicing or repair of the watch after the back of the case has been removed in order, for example, to read the data relating to a previous intervention, or to write data there relating to the intervention underway, input, for example, using a device that is not shown, connected to the reading antenna 22 by the connection 24.

One skilled in the art will understand that the implementations of the tool 2 of the invention can vary greatly, depending mainly on the implementations of the transponder according to the invention to which it is adapted. The type of contact lugs 20 used, for example, must be chosen depending on the type of contact zones 10 of the integrated circuit 1. The arrangement of the elements within the case of the tool can also depend on, for example, the type of antenna 5 that is ordinarily used by the transponder, and the internal antenna 21 of the tool 2 should as much as possible be similar to the antenna 5 of the transponder.

The invention claimed is:

1. A transponder comprising:
   an integrated circuit (1); and
   an antenna (5) electrically connected in a detachable manner to said integrated circuit (1) via a detachable electrical connection,
   wherein said detachable electrical connection comprises at least one intermediate connecting element (4),
   the at least one intermediate connecting element is separate from the integrated circuit,
   wherein said intermediate connecting element (4) guides positioning of at least one portion of said detachable contacts (40) by fastening elements (41),
   wherein said intermediate connecting element consists of a printed circuit (4), said at least one portion of said detachable contacts consisting of contact zones (40) on the first surface of said printed circuit (4),
   wherein the fasting elements are mounting holes, and
   said printed circuit (4) comprises mounting holes, the relative position of said mounting holes relative to said at least one portion of said detachable contacts (40) being predetermined with precision.

2. The transponder according to claim 1, wherein said antenna (5) is electrically connected to said integrated circuit (1) so that said antenna (5) is movable relative to said integrated circuit (1) without interrupting said electrical connection.

3. The transponder according to claim 1, wherein said electrical connection is at least partially implemented by conductive ends (50).

4. The transponder according to claim 1, wherein said intermediate connecting element (4) comprises at least one fastening element (41) that guides positioning of detachable contact zones (10, 40).

5. The transponder according to claim 1, wherein said at least one portion of said detachable contacts (40) are located on said intermediate connecting element (4).

6. The transponder according to claim 1, wherein said detachable contacts consist of contact zones (10, 40) being able to come into contact two by two by pressing one of said two contact zones (10) against the second of said two contact zones (40).

7. The transponder according to claim 1, wherein said antenna consists of a coil (5) with ends (50) attached to said intermediate connecting element (4).

8. The transponder according to claim 3, wherein said ends (50) are free.

9. A transponder comprising:
an integrated circuit (1); and
an antenna (5) electrically connected in a detachable manner to said integrated circuit (1) via a detachable electrical connection,
wherein said detachable electrical connection comprises at least one intermediate connecting element (4),
the at least one intermediate connecting element is separate from the integrated circuit,
wherein said intermediate connecting element (4) guides positioning of at least one portion of said detachable contacts (40) by fastening elements (41),
wherein said intermediate connecting element consists of a printed circuit (4), said at least one portion of said detachable contacts consisting of contact zones (40) on the first surface of said printed circuit (4),
further comprising on the surface opposite said first surface of said printed circuit (4) permanent contact zones (42) allowing connection of the antenna (5) in a fixed manner, each of these permanent contact zones (42) being electrically connected to one of contact zones (40) via a path (43) through said printed circuit (4).

* * * * *